(No Model.)

6 Sheets—Sheet 1.

E. P. SHELDON.
FOLDING AND CUTTING MECHANISM.

No. 604,847.    Patented May 31, 1898.

Witnesses:

Inventor.
Edward P. Sheldon
By Philipp... 
Att'ys

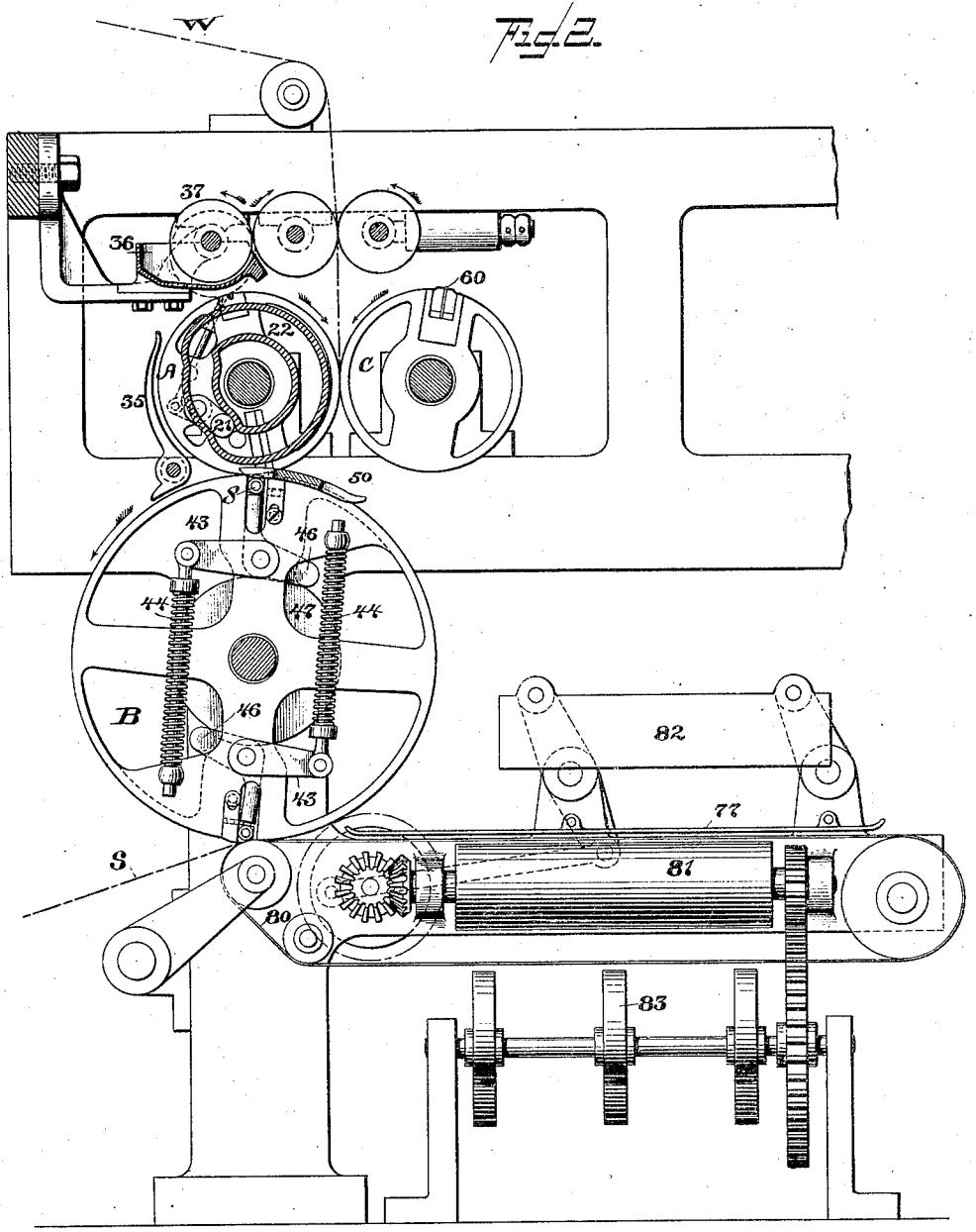

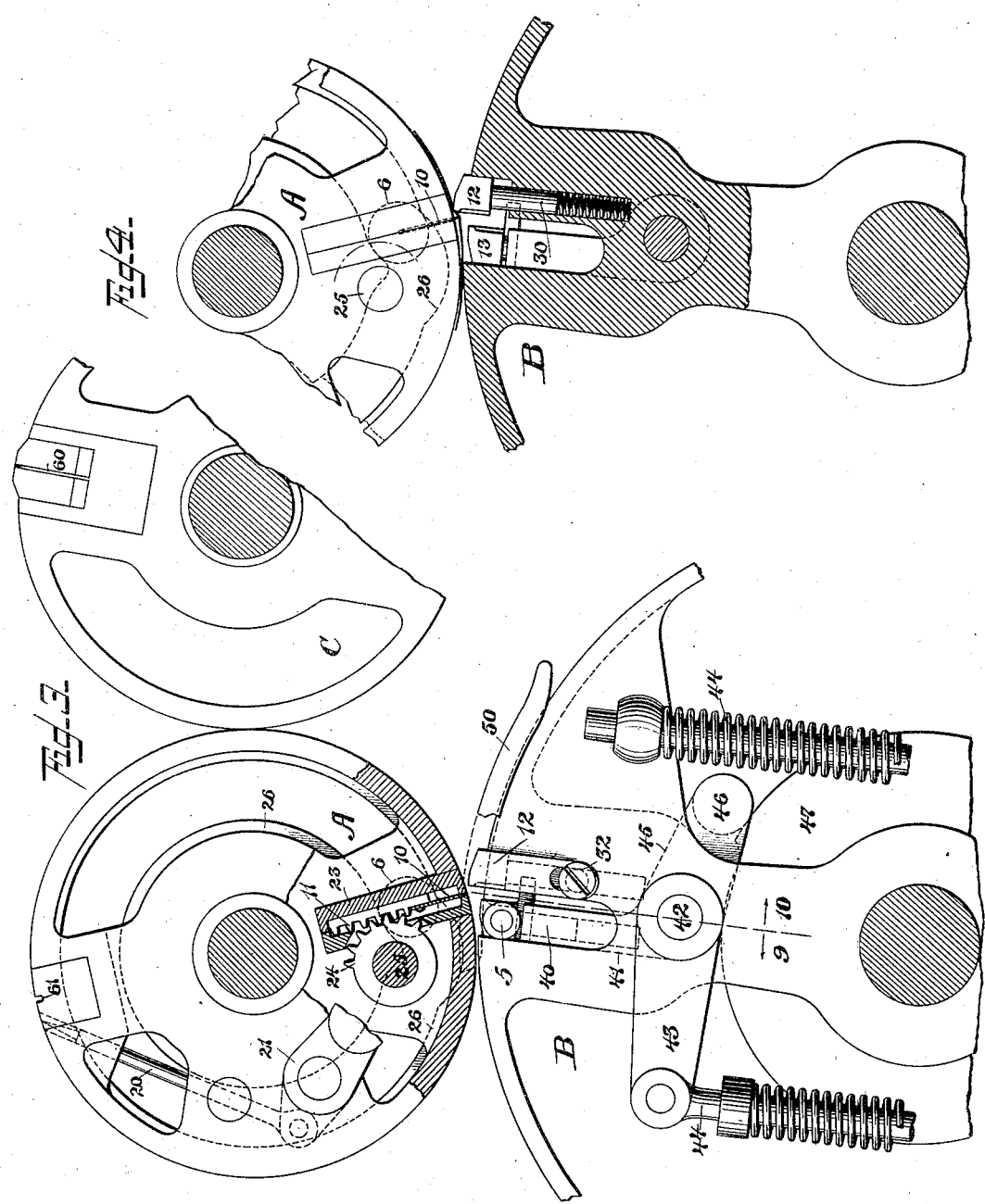

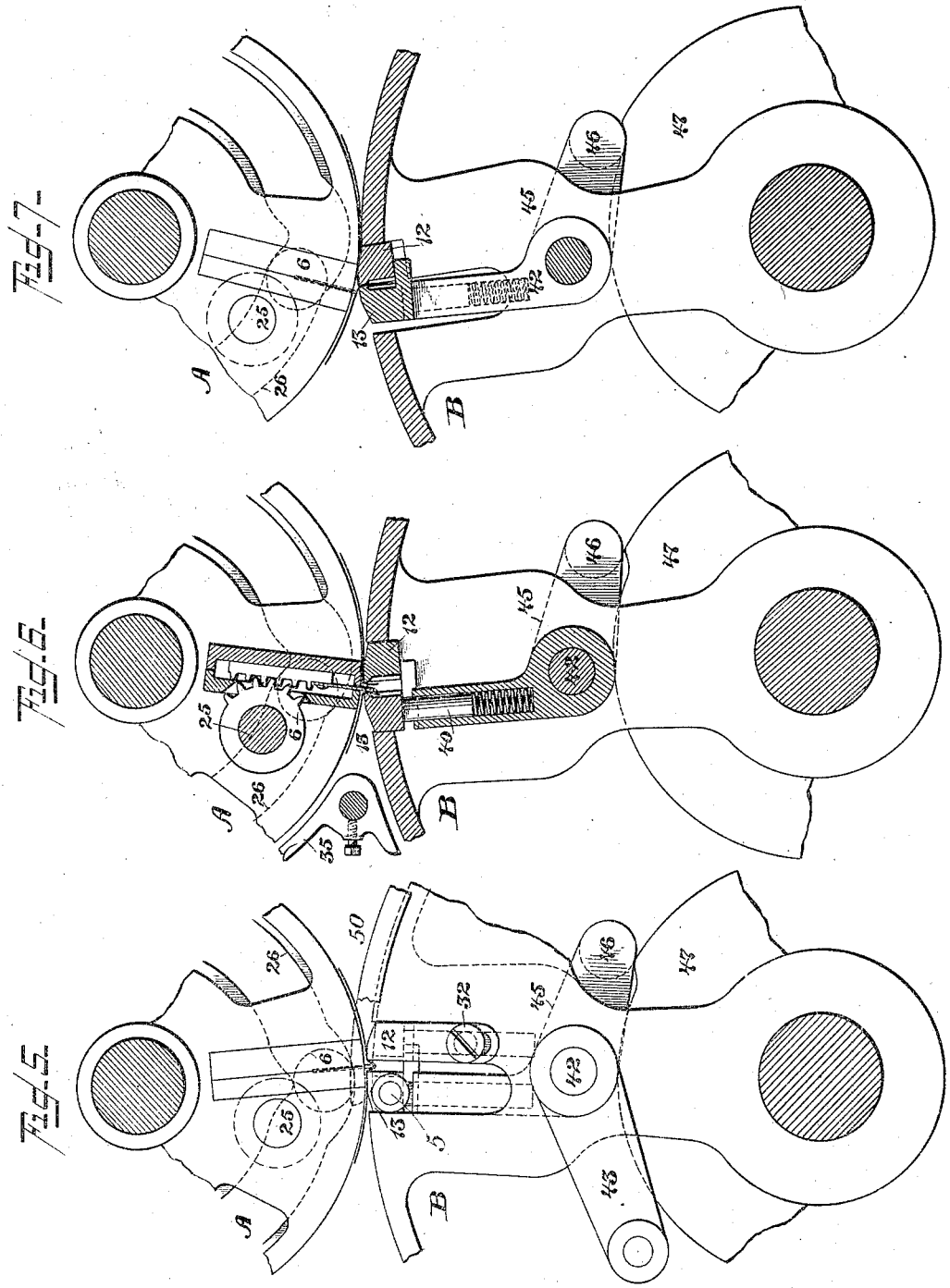

(No Model.) 6 Sheets—Sheet 5.
E. P. SHELDON.
FOLDING AND CUTTING MECHANISM.
No. 604,847. Patented May 31, 1898.
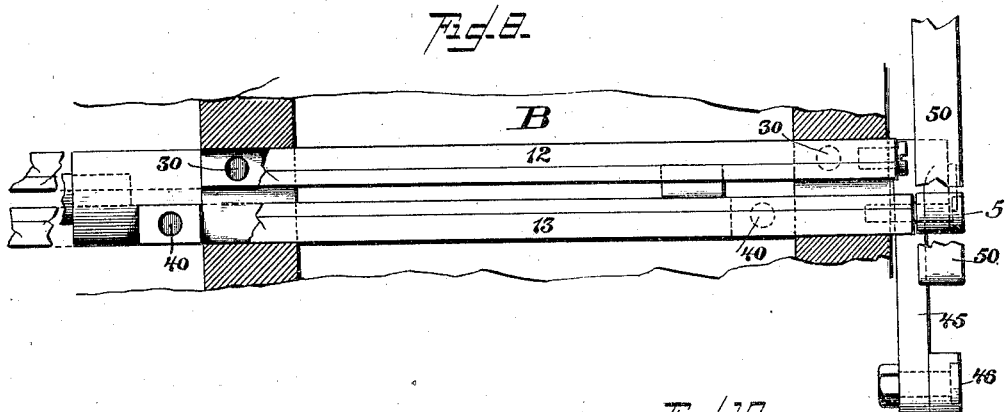
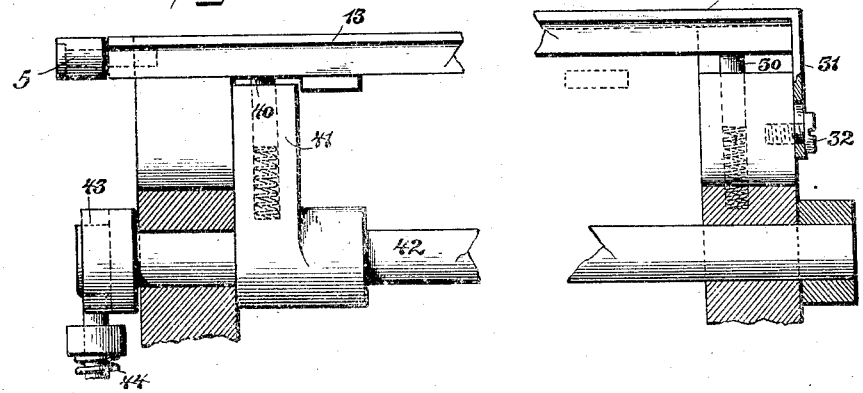
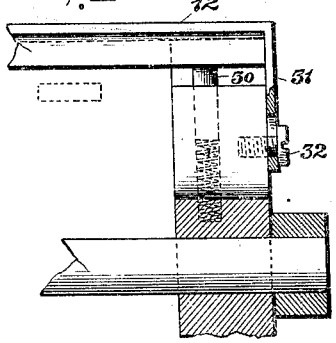
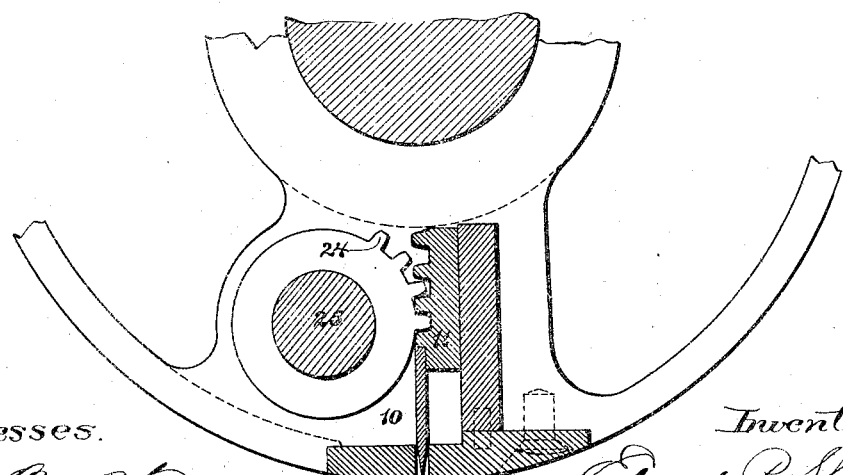
Witnesses. Inventor.
Edward P. Sheldon
By Philipp, Munson & Phelps
Att'ys.

(No Model.) 6 Sheets—Sheet 6.

E. P. SHELDON.
FOLDING AND CUTTING MECHANISM.

No. 604,847. Patented May 31, 1898.

Witnesses:

Inventor:
Edward P. Sheldon
By Philipp, Munson & Phelps
Att'ys.

UNITED STATES PATENT OFFICE.

EDWARD P. SHELDON, OF BROOKLYN, NEW YORK, ASSIGNOR TO ROBERT HOE, THEODORE H. MEAD, AND CHARLES W. CARPENTER, OF NEW YORK, N. Y.

FOLDING AND CUTTING MECHANISM.

SPECIFICATION forming part of Letters Patent No. 604,847, dated May 31, 1898.

Application filed April 12, 1895. Serial No. 545,462. (No model.)

*To all whom it may concern:*

Be it known that I, EDWARD P. SHELDON, a citizen of the United States, residing at Brooklyn, county of Kings, and State of New York, have invented certain new and useful Improvements in Folding and Cutting Mechanism, fully described and represented in the following specification and the accompanying drawings, forming a part of the same.

The object of this invention is to provide an improved folding and cutting mechanism, and especially to provide such a mechanism which shall be adapted to form part of the delivery apparatus of a printing-machine, so that a web or webs of paper may be printed and successive portions severed therefrom be folded and bound into multipage packs cut at their edges.

To this end the invention comprises various features of construction and combinations of devices, all of which will be fully described and claimed hereinafter.

The accompanying drawings illustrate one embodiment of this invention, in which—

Figure 1:
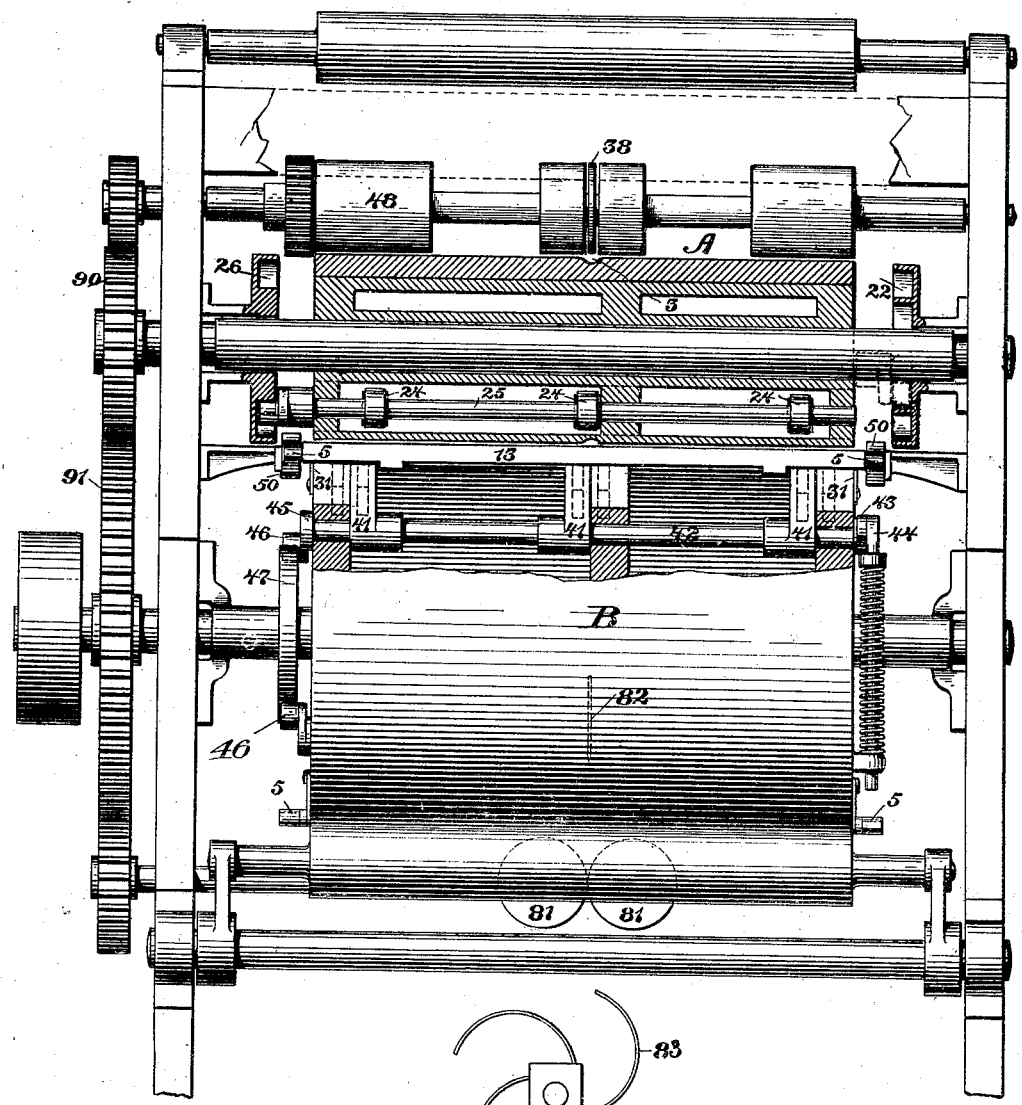
Figure 12:
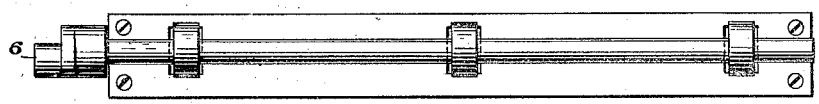
Figure 13:
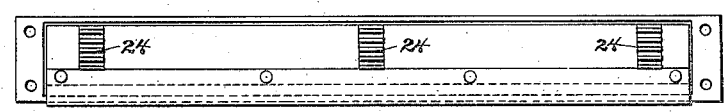
Figure 14:
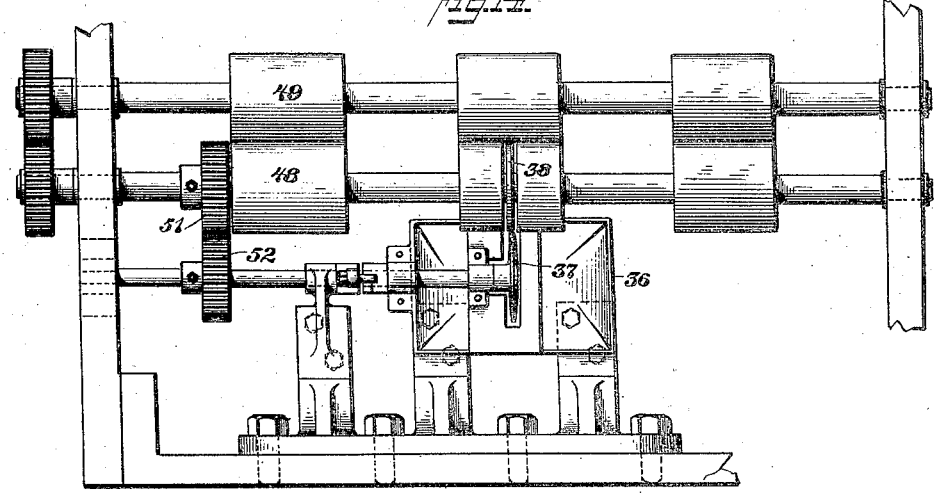

Figure 1 represents an elevation, partly in section, of a delivery mechanism embodying this invention and adapted to deliver the product of an ordinary web-printing machine. Fig. 2 is a side elevation of the same. Figs. 3, 4, 5, 6, and 7 are enlarged detail views illustrating the tucking cutting devices in various positions of their operation. Fig. 8 is a plan view of the jaws 12 13 and shows about one-half their longitudinal extent. Fig. 9 is an elevation of a part of the jaw 13 as seen on the section-line of Fig. 3, looking in the direction of the arrow-head 9. Fig. 10 is an elevation of the jaw 12 as seen on the section-line of Fig. 3, looking in the direction of the arrow-head 10. Fig. 11 is an enlarged view of the tucking cutting-blade slightly modified. Fig. 12 is a plan view of the housing of the tucking cutting-blade. Fig. 13 is a similar view of the same with the outer plate removed. Fig. 14 is a plan view of the feed-rolls and pasting apparatus.

These improvements will be best understood by first describing the mechanisms which perform the simultaneous tucking or folding and cutting, since they form the primary mechanism with which others are associated for coöperation. These simultaneous tucking and cutting mechanisms are supported by two revolving carriers A B, between which the paper (whether in sheets or the web) to be operated upon is passed, and to which said paper may be fed or delivered in any suitable way, though preferably it will be first passed between the carrier A and the companion carrier C, which are provided with a cutting mechanism to sever webs passed between them, as in Fig. 2, into lengths equal to their circumferential extent. Such severed lengths, whether so formed or fed between the carriers A C in the form of sheets, will have their leading ends controlled by the carrier A through some suitable device, as grippers, pins, and the like sheet retaining and releasing devices. Here the carrier A is shown as provided with sheet-impaling carrying-pins 20, mounted as is customary in this art in guides within the carrier A and connected with a rock-shaft having rock-arms, as 21, whose studs or bowls run in a cam, as 22, (see Fig. 2,) whereby said pins may be protruded from and withdrawn into the carrier A at suitable times, as is common. The head of a sheet or the end of a web or webs to constitute sheets is impaled by these pins as the point where the carriers A C run nearest into contact is passed, and so engaged the sheet or web will be carried by said pins around upon the carrier A until the pins are withdrawn to release the same. The carrier A is provided with a tucking cutting-blade 10, projecting from a holder 11, that is mounted in a box 23 in such a manner that said blade may be guided therein while moving radially to be projected from and withdrawn into the carrier A, such movements in the instance shown being imparted to the blade 10 by means of racks on its holder 11 and segments 24 on the shaft 25, which shaft is rocked to vibrate said segments by means of a rock-arm 6 and a cam 26. The carrier B supports duplicate sets of jaws 12 13, each set in turn coöperating with this tucking cutting-blade 10. As these duplicate sets of jaws 12 13 are constructed and operate in the same way, only one set of them will be described, which description will equally apply to both, as duplicate letters and figures of reference indicate like parts.

These jaws are approximately of a length equal to that of the carrier B and are both capable of movement therein. The jaw 12 is supported in the carrier B by means of stems 30, which enter into suitable sockets provided to receive them, said stems being seated upon springs, so that the jaw 12 is primarily pressed outward, the limit of which outward movement of it is determined by slotted arms 31 and a screw 32, which acts as a stop. The jaw 13 is likewise mounted upon spring-seated stems, as 40; but the sockets for receiving these stems are formed in rock-arms 41, that project from a rock-shaft 42, said shaft 42 being journaled in the cylinder-heads and provided at one end with a rock-arm 43, attached to a spring-rod 44, and at the other end with a rock-arm 45, whose stud or end 46 bears on a stationary cam 47, and this cam is so shaped that at a proper time during the coöperation of the jaws with the tucking cutting-blade the jaw 13 will be slightly vibrated toward the jaw 12. The outward radial movement of the jaw 13 is controlled during its approach to and action at the point of coöperation with said blade by means of curved shoes 50, underneath which the friction-rolls 5 on the ends of the jaw 13, protruding beyond the carrier B, engage and travel beneath. These shoes 50 are supported upon brackets projecting from the side frames, and they have curved entrance and exit ends, as appear in the drawings.

The carriers A C are geared together to run in unison by means of wheels, one, 90, of which is shown as being driven by a wheel 91 on the main shaft of the cylinder B, which may be a driving-shaft, as shown, or a shaft driven by gearing from the printing-machine with which this delivery apparatus is connected.

It will now be understood that a web of paper moved onward by feed-rolls 48 49 and descending between the carriers A C will by having its leading end impaled by the pins 20 be held by the carrier A and laid upon its surface, and this web will in passing the point where these carriers contact be severed transversely by the cutting-blade 60, supported in the carrier C, and the coöperating cutting-slot 61, provided in the carrier A. A sheet equal in length to the circumference of these carriers will thus be produced, the leading end of which, secured by the pins 20, will be carried around upon the periphery of the carrier A until these pins are withdrawn to release the same, which will be at a time suitably related to that at which the tucking-blade 10 begins to operate upon the sheet, and pass it off from said carrier to enable the sheet to leave the pins without being ruptured or torn thereby and be guided in its reverse movement by the guards 35. Just in advance of the tucking cutting operation (see Fig. 4) the paper web or sheet will be pressed between the jaw 12 and the periphery of the carrier A, and be thus held adjacent to the blade 10, at which time the rock-arm 6, by which the blade 10 is moved outward, will be entering the high part of the cam 26, which compels its outward movement. About simultaneous with the nipping of the paper by the jaw 12 the pins 20 are withdrawn to allow the forward end of the web to be drawn back slightly by the outward movement of the blade 10, so that a bight or fold will be formed in the paper between the jaws 12 13, and then a slight further onward movement of the carriers A B will bring the jaw 13 into contact with the paper, so as to press the same upon the periphery of the carrier A, the blade 10 simultaneously making its complete outward movement, as in Fig. 6. By these operations the paper will not only be tucked or pressed or folded in between the jaws 12 13, but its line of pressing, tucking, or folding will be severed by the combined action of said knife, its movement, and the holding effect of the jaws 12 13. Thus severed transversely its edges bordering the knife will project sufficiently between the jaws 12 13, as in Fig. 6, to be embraced or nipped thereby when the same close. A slight further onward movement of the carriers causes the rock-arm 6 to withdraw the blade 10, and simultaneously therewith the rock-arm 46, forced into the low part of the cam 47, causes the jaw 13 to close and nip the projecting ends of the severed paper between the jaws 12 13, as in Fig. 7. The sheet is thus severed transversely, so as to divide it into two parts or constitute two small sheets, which, seized by their leading ends, are now carried onward with the rotative movement of the carrier B for delivery or to be further operated upon. As their severed ends are nipped by the jaws 12 13 of the carrier B they, following its periphery, cause the two sheets to be lapped together or associated thereon, in which condition they are carried onto the tapes 80, and, being released by the opening of the jaw 13, caused by its rock-arm 43 being moved by the cam 47, these sheets pass outward, carried by the tapes 80 under guides or conductors 77, over folding-rollers 81, and beneath a folding-blade 82, which blade, reciprocated as shown or by any other means, doubles or folds the associated sheets into the rollers 81, passing through which they emerge longitudinally folded or in a book-like pack of four leaves, which may be piled flat by an S-fly 83, as shown, or in any common manner. If now the web, as W, is passed through a suitable pasting mechanism, so as to be supplied with a longitudinal line of paste on the line of final or longitudinal fold, the product of four leaves or eight pages will be bound together, cut at the head, and constitute a book-like product. The pasting apparatus shown consists of a paste-fountain 36, a fountain-disk 37, and an applying-disk 38, the latter being for convenience on the shaft of feed-roll 48 and the fountain-disk 37 being positively driven, if desired, as by pinions 51 52.

It is obvious that the web W might be given its longitudinal line of paste at any other point in its passage from the last printing-cylinder to the folding-rollers 48 49 or carriers A C; also, that if two webs are introduced between the carriers A B the second web will require an appropriate line of paste in order to produce a bound product; also, that if a properly wide web is doubled on its way to this delivery mechanism, as by an ordinary longitudinal folder, the two plies thus composed will, in order to produce a bound product, require an appropriate longitudinal line of paste, the presence of which in passing over the said folder may be provided for by a recess in the folder, substantially such as the recess 3, with which the carrier A is provided, so that the paper may pass over the surface without its pasted line being disturbed thereby. In order that the product may be as complete as possible, a supplement-web, as S, perforated at suitable points for detachment of portions to constitute covers, may be fed at appropriate speed into the nip of tapes 80 and the carrier B to supply covers to the associated pack produced as has been described, the product being thus made a complete book.

In Fig. 11 is shown an enlarged view of a modification of the folding tucking blade, showing how it may be differently introduced and supported in the cylinder than is shown in the other figures.

What is claimed is—

1. A folding and cutting mechanism, consisting of a carrier supporting a blade constructed so as to tuck and sever material fed within its range of action, and a companion carrier provided with means coöperating with said blade to freely receive the doubled portion of the material tucked by said blade and then support the same by means nipping the material at opposite sides of the blade while the latter is performing its severing operation, substantially as described.

2. A folding and cutting mechanism, consisting of a carrier supporting a blade constructed so as to tuck and sever material fed within its range of action, and a companion carrier provided with means coöperating with said blade to freely receive the doubled portion of the material tucked by said blade and then support the same by means nipping the material at opposite sides of the blade independent thereof while the latter is performing its severing operation, substantially as described.

3. The combination with a carrier supporting a blade, a companion carrier supporting spring-seated jaws, and means for feeding a sheet thereto, of means causing the blade to move primarily to tuck the sheet between said jaws, and, secondarily, to force the blade through said sheet while it is pressed by the jaws against the blade-carrier on opposite sides of the blade, substantially as described.

4. The combination with a carrier supporting a blade, a companion carrier supporting spring-seated jaws, and means for feeding a sheet thereto, of means causing the blade to move primarily to tuck the sheet between the open jaws, and secondarily to force the blade through said sheet while it is pressed by the jaws against the blade-carrier on opposite sides of the blade, and means causing the jaws to close and nip the severed ends of the divided sheet, substantially as described.

5. The combination with a carrier supporting a blade, a companion carrier supporting jaws, and, means for feeding a sheet thereto, of means causing said blade primarily to tuck the material between said jaws, means holding said jaws open and one of them out of contact with the material during the tucking movement of the blade, means moving said blade secondarily to force it through the material to sever it, and means causing both of said jaws while separated to nip the material on opposite sides of the blade against its straining force during the severing operation, substantially as described.

6. The combination with a carrier supporting a blade, a companion carrier supporting jaws, and, means for feeding a sheet thereto, of means causing said blade primarily to tuck the material between said jaws, means holding said jaws open and one of them out of contact with the material during the tucking movement of the blade, means moving said blade secondarily to force it through the material to sever it, means causing both of said jaws while separated to nip the material on opposite sides of the blade against the straining force during the severing operation, and means causing the jaws to nip the severed ends of the divided sheet and carrying the same onward, lap its plies together and deliver the same associated, substantially as described.

7. In a sheet-delivering mechanism consisting of a rotating carrier supporting a blade and means for projecting it primarily to tuck outward the material and secondarily, to sever the same, and of a companion rotating carrier provided with spring-seated jaws coöperating with said blade to support the material while being tucked and severed, the combination of guards 50 constructed and operating to maintain the foremost jaw in its depressed condition during the tucking operation, substantially as described.

8. In a sheet-delivering mechanism consisting of a rotating carrier supporting a blade and means for projecting it primarily to tuck outward the material and secondarily, to sever the same, of a companion rotating carrier provided with spring-seated jaws coöperating with said blade to support the material while being tucked and severed, the combination of guards 50 constructed and operating to maintain the foremost jaw in its depressed condition during the tucking operation and to release the same so that the material is nipped between the jaws and the carrier of said blade
5 during the severing operation, substantially as described.

In testimony whereof I have hereunto set my hand in the presence of two subscribing witnesses.

EDWARD P. SHELDON.

Witnesses:
  H. T. MUNSON,
  A. L. KENT.